P. T. JACKSON.
FLUID CONTROL APPARATUS.
APPLICATION FILED AUG. 31, 1918.
1,301,131.
Patented Apr. 22, 1919.
2 SHEETS—SHEET 1.
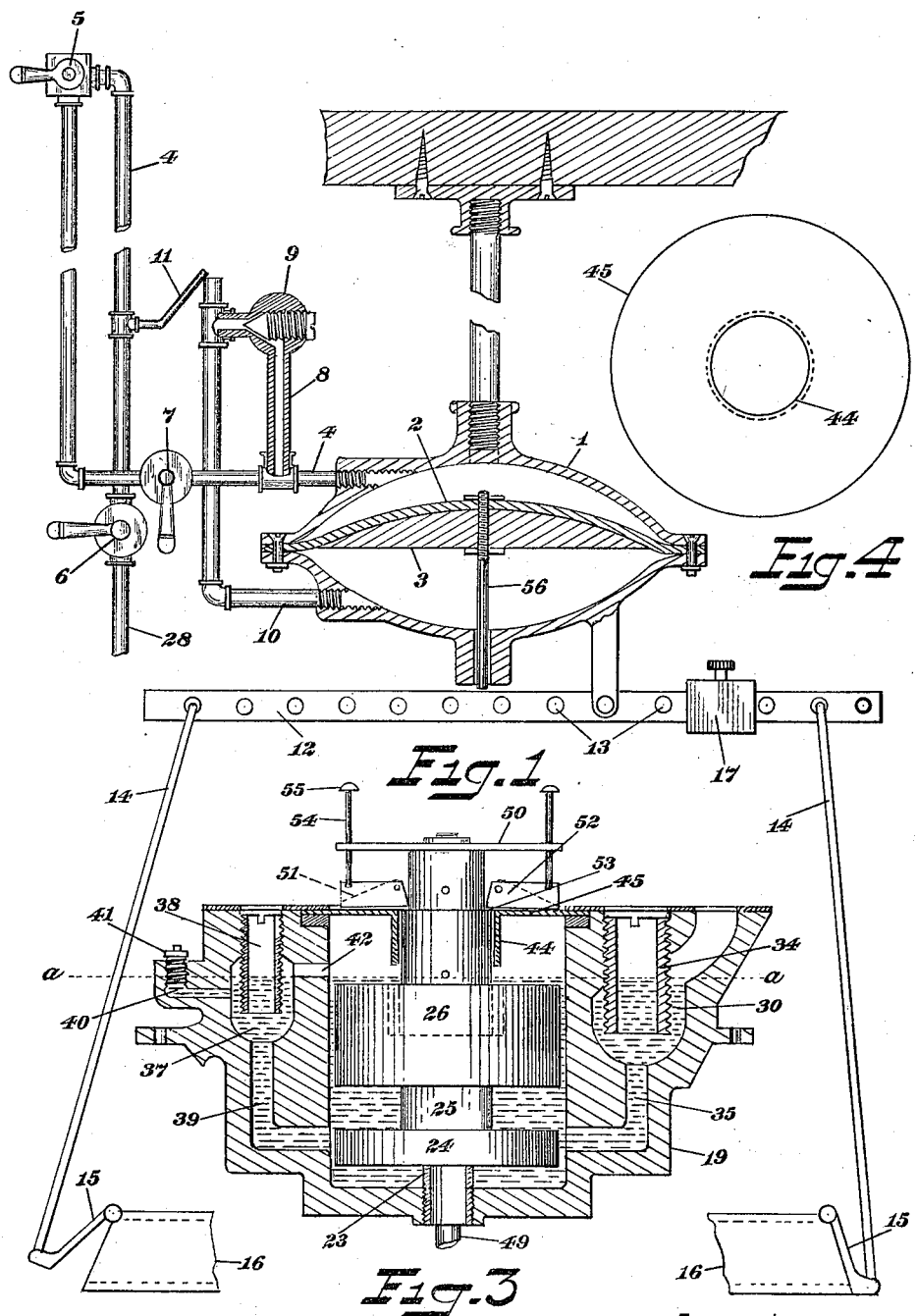

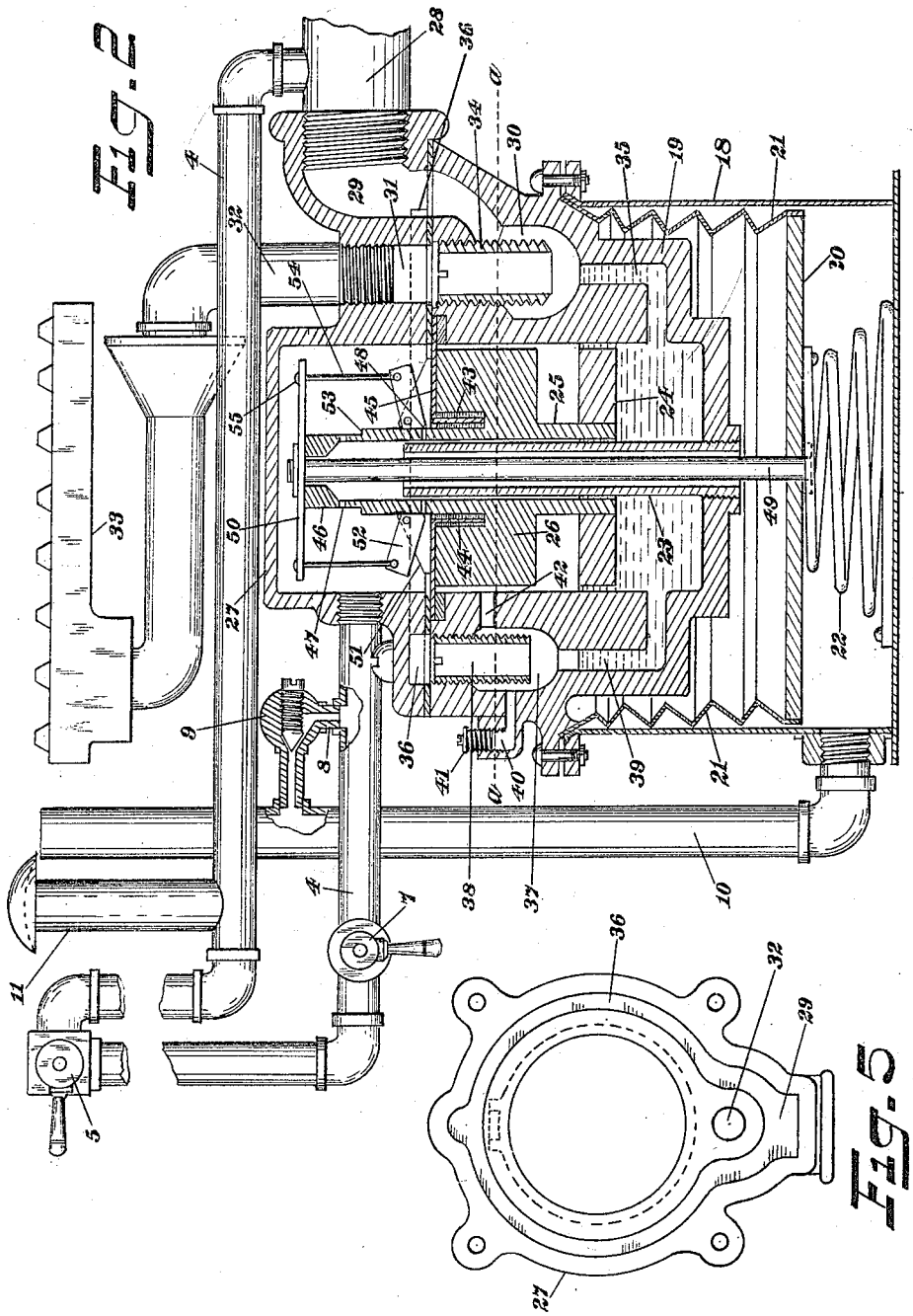

UNITED STATES PATENT OFFICE.

PHILIP T. JACKSON, OF TORONTO, ONTARIO, CANADA.

FLUID-CONTROL APPARATUS.

1,301,131.  Specification of Letters Patent.  Patented Apr. 22, 1919.

Application filed August 31, 1918. Serial No. 252,208.

*To all whom it may concern:*

Be it known that I, PHILIP T. JACKSON, of the city of Toronto, in the county of York, Province of Ontario, Canada, have invented certain new and useful Improvements in Fluid-Control Apparatus, of which the following is a specification.

This invention relates to devices intended to control the flow of a fluid from a distance, and particularly thermostatically, and my object is to devise means for effecting this control through the medium of a fluid and particularly by the use of the pressure of the combustible gas supplied from a distributing system.

I attain my object by means of the constructions hereinafter described and illustrated in the accompanying drawings in which—

Figure 1 is an elevation, partly in section of a simple form of my invention;

Fig. 2 an elevation, partly in section, of an elaborated form of the device;

Fig. 3 an elevation, partly in section, of parts of the mechanism shown in Fig. 2 in a different position;

Fig. 4 a plan view of the flanged disk forming part of the mercury seal shown in Fig. 2; and Fig. 5 a plan view of the underside of the cap of the mercury chamber showing particularly the annular passage therein.

In the drawings like numerals of reference indicate corresponding parts in the different figures.

Referring particularly to Fig. 1, 1 is a diaphragm chamber in which is secured a diaphragm 2 dividing the same. This diaphragm is preferably provided with a convex plate 3 tending to distribute the pressure over the surface of the diaphragm. With the space above the diaphragm communicates a pipe 4 in which is located a control valve 5, which may be thermostatically operated, and preferably a shut-off cock 6 is also provided adjacent the connection of the gas supply. This valve controls the pilot light 11 as well as the apparatus and is not shown in Fig. 2. A local control valve 7 is also preferably provided close to the apparatus, by means of which the flow of gas to the space above the diaphragm chamber may be regulated, but which does not control the pilot light.

A pipe 8 communicates with the space above the diaphragm preferably by being connected with the pipe 4 between the apparatus and the control valve 7. A needle valve 9 is located in this pipe. By means of this needle valve a restricted leakage at any desired rate may be permitted.

Communicating with the space below the diaphragm is a seepage pipe 10 which will lead off to any convenient place any gas which may leak through the diaphragm. Preferably both the waste pipe 8 and the seepage pipe 10 are connected as shown and the pilot light 11 fed from the pipe 4 at the supply side of the valve 5 is so located as to ignite any gases passing through the pipes 8 and 10. The diaphragm is used to actuate valves or other devices controlling the flow of fluids. In the drawing I show the diaphragm provided with a plunger 56 engaging a lever 12 fulcrumed on the diaphragm chamber and provided with a series of holes 13 with which may be engaged connecting rods 14 pivotally connected with gate valves 15 controlling openings in the pipes 16, which may, for example, be passages through which air passes to the ashpit of a furnace or to the smoke flue thereof. An adjustable counterbalancing weight 17 is provided whereby the diaphragm and moving parts may be returned to their original position after the pressure of the gas on the diaphragm has been relieved.

If the device is to be used to control the flow of combustible gas to a burner, particularly if the burner be of the Bunsen type, it is important that the movements of cutting off and turning on the gas supply be effected suddenly, as otherwise there is danger of the gas firing back to the gas injection pipe of the burner.

In Figs. 2, 3, 4 and 5, I show a modification of the device adapted to operate in the desired manner. The diaphragm chamber 18 has its top formed by the mercury chamber 19, and the diaphragm is preferably of the bellows type, 20 being the bellows end and 21 the collapsible sides clamped as shown between the flange of the mercury chamber and the wall of the diaphragm chamber. A taper coil spring 22 engages the bottom of the diaphragm chamber at the bellows end 20 and yieldingly tends to press up the said end. The mercury chamber has an opening formed in the lower end thereof into which is screwed an upwardly extending tube 23. On this tube is loosely sleeved a float. This float comprises a lower disk 24 connected by a restricted neck 25 with the cylindrical upper part 26. In the mercury chamber is located a body of mercury and the float is so proportioned and its travel restricted that the float normally will be supported with the upper surface of the lower disk 24 at the mercury level.

A cap 27 is secured to the top of the mercury chamber and with the interior of this cap the pipe 4 communicates. The same control valves are employed, the same valve-controlled waste pipe, the same seepage pipe and the same pilot light as in the form shown in Fig. 1.

The main supply pipe 28 in which there is a control valve (not shown), communicates with the space 29 within the cap 27. In the wall of the mercury chamber is formed a passage 30 which communicates with the opening 31 in the cap 27 into which is screwed a supply pipe 32 leading to the burner 33. The passageway 30 which communicates with the space 29 is trapped, the trap being formed by the depending tube 34 screwed into the upper part of the passage 30 in line with the opening 31 and extending into the lower part of the passage 30 free of the walls thereof. The lower part of the passage 30 is connected with the lower part of the mercury chamber by the passage 35.

Communicating with the space 29 is an annular passage 36, which communicates with the tube 38 which is dependent from the top of the chamber 37 and communicates therewith. The tube 38 is threaded into the upper part of the chamber 37 and is spaced from the walls thereof and forms a trap therewith. The passage 39 forms a communication between the chamber 37 and the lower part of the mercury chamber.

Communicating with the chamber 37 is a filling opening 40 closed by a screw plug 41. Through the opening mercury may be introduced to maintain the proper level in the mercury chamber. An opening 42 is formed leading from the chamber 37 to the interior of the mercury chamber above the upper mercury level $a$, $a'$ therein.

Normally communication between the interior of the cap 27 and the interior of the mercury chamber above the mercury is closed by a mercury seal arranged as follows: In the part 26 of the float is formed an annular cup 43 into which dips an annular flange 44 formed on an annular metal plate 45 (see Fig. 4) securely held between the cap and the wall of the mercury chamber. The float just within the mercury cup is provided with the tubular upward extension 46, through the sides of which are formed one or more holes 47 and also just at the upper edge of the mercury cup 43 with one or more holes 48 through which any mercury that may be forced up inside the bore of the float may escape and not run down inside the tube 23 into the bellows chamber.

Connected with the bellows end is a plunger rod 49 which extends up through the tube 23. At the end of this tube is secured a crosshead 50 which engages the upper end of the tubular extension 46 of the float. On the plate 45 is formed one or more lugs 51 on each of which is pivoted a latch 52 normally tending to fall to the position shown in Fig. 3 in which their inner ends engage on an annular shoulder 53 formed on the extension 46. Pivotally connected with each latch is a rod 54 which extends through the crosshead 50 so as to slide therein. A head 55 is formed on each rod so that the crosshead may raise the latches when the parts occupy the position shown in Fig. 2.

From the construction described it will be seen that there are three main passageways provided for the flow of fluid. The first for the introduction of fluid pressure above the diaphragm is from the pipe 4, through the interior of the cap 27, through the holes 47, through the tube 23, and into the space above the bellows end 20. A second passage for the supply of fluid is through the pipe 28, through the space 29, the chamber 30, the tube 34, the opening 31, and thence through the supply pipe 32 to the burner. The third passage is from the main supply pipe 28, through the space 29, the annular passage 36, the tube 38, the chamber 37, the passage 42, thence, when the float is lowered, under the flange 44 to the interior of the cap, which is in communication with the space above the bellows end.

In the second passageway is located a trap formed by the lower end of the tube 34 and in the third passageway is located a trap formed by the lower end of the tube 38, which traps are adapted to be sealed by the displacement of mercury through the passages 35 and 39. It will be noted that the lower end of the tube 34 is below the level of the lower end of the tube 38, so that the second passage will be sealed by the displacement of the mercury before the third passage is sealed, the opening of the passages taking place in the reverse order when the float lifts.

Assuming that a combustible gas is the controlling fluid, the operation of the device is as follows: Referring more particularly to the embodiment shown in Fig. 1 and assuming that the diaphragm is up, and the lever 12 is in the position shown, the main valve 6 is opened and the pilot light 11 lighted. Suppose that the thermostat 5 be open, then on opening the local control valve 7, gas will flow through the pipe 4 pushing down the diaphragm and depressing the lever 12, thus closing the left hand valve 15 and opening the right hand valve. The valve in the waste pipe is then adjusted so as to allow a slow escape of gas, which is ignited by the pilot light 11. If now the thermostat valve 5 closes, the gas supply to the space above the diaphragm will be cut off and the gas in said space above the diaphragm will gradually leak out and burn. This will allow the weight 17 to raise the diaphragm and thus bring the lever 12 and the valve 15 again to the position shown in Fig. 1.

When, due to change of temperature, the thermostatic valve again opens, gas will again flow to the space at the upper side of the diaphragm operating the latter and the parts connected therewith in the manner already described.

The operation of the elaborated form of the device shown in Figs. 2 to 5 is substantially as follows: Gas being admitted by the action of the thermostatic valve 5 to the pipe 4, flows into the space in the cap 27, thence through the second main passage hereinbefore described and depresses the bellows end 20. The plunger rod is drawn down and with it the cross head 50, which draws down with it the float. As the lower part of the float is already submerged to its upper surface, and as the cross sectional area of the neck 25 is comparatively small, very little change takes place in the level of the mercury until the main part 26 of the plunger enters the mercury. By the time this happens the lower edge of the flange 44 of the mercury seal of the third passage hereinbefore referred to will have cleared the top of the annular cup 43, which is always full of mercury. Up to this point all the movements described will or may be very slow, depending on the speed at which the temperature changes and the thermostatic valve opens. The instant, however, that the lower edge of the flange aforesaid clears the top of the mercury in the cup 43, the third main passage hereinbefore referred to is open and gas rushes in from the main supply pipe 28 around the annular passage 36 in the cap, through the tube 38, the chamber 37, and through the passage 42 into the space within the cap 27, thence through the holes 47 in the tubular extension 46 and down through the tube 23 to the space above the bellows end 20. The bellows end is immediately forced down to its lower limit of movement, and the mercury in the mercury chamber 19 rapidly displaced. The first result of this displacement is to seal the trap formed in the second main passage hereinbefore referred to, closing off the supply to the burner. The next result is to seal the trap in the third main passage hereinbefore referred to, thus cutting off the direct supply of gas from the main supply pipe 28 to the space above the bellows end.

As soon as the float reaches its lower limit of movement, the latches fall to a position to engage the shoulder 53 as shown in Fig. 3, the rods 54 sliding through the crosshead 50. The first part of the cycle of operations is then complete. The supply to the burner is shut off and also the direct supply of gas to the space above the bellows end and the float is locked down in its lower position against the lifting tendency of the mercury in which it is submerged. The line $a$—$a$ indicates the level to which the upper surface of the mercury rises when the float is thus depressed therein. It will be noticed that this level is above the top of the float and that the mercury cup 43 will therefore be refilled each time that the plunger is depressed. There is, of course, as in the simple form of the apparatus a constant leakage of gas from the space above the bellows end, which is consumed at the pilot light.

Supposing now that the temperature changes and the thermostatic valve closes the pipe 4, the supply to the space above the bellows end is cut off and the gas remaining gradually leaks away and is consumed at the pilot light. This allows the spring 22 to push up to bellows end and with it the plunger rod 49 and the crosshead 50. No change takes place in the other moving parts until the crosshead has been moved up sufficiently to engage the heads 55 of the rods 54. As soon as this occurs a further movement of the bellows gradually raises the latches until they disengage from the shoulder 53. Instantly the flotative force of the mercury acting on the float moves the latter rapidly back to the position shown in Fig. 2. The consequent lowering of the mercury level first unseals the trap in the third main passage hereinbefore referred to, then opens the second main passage hereinbefore referred to, restoring the supply of gas to the burner, while just before the third passage referred to is unsealed, it is resealed by the reëngagement of the flange 44 in the mercury in the cup 43.

The mercury cup is always kept properly filled as the parts are so proportioned that the upper surface of the upper part 26 of the float will be depressed just below the surface of the mercury as shown in Fig. 3 when the float is in its lowest position.

In case any other than a combustible fluid be employed as the controlling fluid, the means described for consuming the waste fluid may be dispensed with.

What I claim as my invention is:—

1. In a fluid control apparatus, the combination of a diaphragm casing; a diaphragm across the same; a pipe forming a passage for conveying fluid under pressure to the space at one side of the diaphragm; means yieldingly tending to maintain the diaphragm in normal position; a valve in said pipe for controlling the flow of fluid therein; a second passage for fluid independent of the first passage; a valve mechanism controlling said second passage; a plunger connected with the diaphragm; and means whereby the plunger actuates said valve control mechanism.

2. In fluid control apparatus, the combination of a diaphragm casing; a diaphragm across the same; a pipe forming a passage for conveying fluid under pressure to the space at one side of the diaphragm, a restricted waste passage being provided to relieve pressure from said space; means yieldingly tending to maintain the diaphragm in normal position; a valve in said pipe for controlling the flow of fluid therein; a second passage independent of the first and adapted to convey a fluid under pressure from a source of supply to the place of use; valve mechanism controlling said second passage; and means whereby the diaphragm actuates said valve control mechanism.

3. In fluid control apparatus, the combination of a diaphragm casing; a diaphragm across the same; a pipe for conveying a combustible gas leading to the space at one side of the diaphragm, a restricted waste passage being provided to relieve pressure from said space; means yieldingly tending to maintain the diaphragm in normal position; a pilot light adapted to be fed from the main gas supply and located at the outlet end of the waste passage; a valve in said pipe for controlling the flow of fluid therein; a second passage adapted to convey a fluid under pressure from a source of supply to the place of use; valve mechanism controlling said second passage; and means whereby the diaphragm actuates said valve control mechanism.

4. In fluid control apparatus, the combination of a diaphragm casing; a diaphragm across the same; a pipe for conveying fluid under pressure leading to the space at one side of the diaphragm; means yieldingly tending to maintain the diaphragm in normal position; a valve in said pipe for controlling the flow of fluid therein; a second passage adapted to convey a fluid under pressure from a source of supply to the place of use; valve mechanism controlling said second passage and yieldingly tending to move to the open position; lock mechanism for releasably holding the valve mechanism in the closed position; valve and lock control connections whereby the diaphragm when depressed to a predetermined limit sets and locks the valve mechanism in the closed position, lost motion being provided in said connections so that the lock will not be released until the diaphragm has returned substantially to normal position; a passage between the main fluid supply and the space above the diaphragm controllable by the said valve mechanism and adapted to be opened by said mechanism to admit the full fluid pressure above the diaphragm after the latter has been depressed to a predetermined extent, whereby the latter is suddenly moved to its lowest position and the valve mechanism thereby moved to a position to fully close the aforesaid second passage.

5. In fluid control apparatus, the combination of a diaphram casing; a diaphragm across the same; a pipe for conveying fluid under pressure leading to the space at one side of the diaphragm; means yieldingly tending to maintain the diaphragm in normal position; a valve in said pipe for controlling the flow of fluid therein; a second passage adapted to convey a fluid under pressure from a source of supply to the place of use; valve mechanism controlling said second passage; and yieldingly tending to move to the open position; means whereby the movement of the diaphragm under fluid pressure will admit fluid pressure from the second passage at the inlet side of the valve mechanism to the aforesaid space in the diaphragm casing to move the diaphragm to its limit of movement and cause the valve mechanism to close the said second fluid passage; means for releasably holding said valve mechanism in the closed position; and means whereby the diaphragm on return substantially to normal position will release the valve mechanism to enable it to open said second passage.

6. In fluid control apparatus, the combination of a diaphragm casing; a diaphragm across the same; a pipe for conveying fluid under pressure leading to the space at one side of the diaphragm; means yieldingly tending to maintain the diaphragm in normal position; a valve in said pipe for controlling the flow of fluid therein; a second passage adapted to convey a fluid under pressure from a source of supply to the place of use; a third passage from the source of supply leading to the aforesaid space in the diaphragm casing; a body of mercury adapted to control the second passage; a float movable by the diaphragm to displace the mercury to close the second passage; a mercury seal in the third passage adapted to be broken by the depression of the float; connections between the diaphragm and the float whereby the former may depress the float but is free to rise independently, the various parts being proportioned and arranged so that the movement of the float will break the mercury seal in the third passage before the second passage is closed; means for releasably locking down the float; and means whereby the diaphragm on returning substantially to its normal position will release the float.

7. In fluid control apparatus, the combination of a diaphragm casing; a diaphragm dividing the same; a pipe for conveying a combustible gas leading to the space at one side of the diaphragm, a restricted waste passage being provided to relieve pressure from said space; means yieldingly tending to maintain the diaphragm in normal position; a pilot light adapted to be fed from the main gas supply and located at the outlet end of the waste passage; a valve in said pipe for controlling the flow of fluid therein; a second passage adapted to convey a fluid under pressure from a source of supply to the place of use; valve mechanism controlling said second passage; means whereby the diaphragm actuates said valve control mechanism; and a pipe leading from the space at the opposite side of the diaphragm chamber to the waste pipe.

8. In fluid control apparatus, the combination of a diaphragm casing; a diaphragm across the same; a pipe for conveying fluid under pressure leading to the space at one side of the diaphragm, a restricted waste passage being provided to relieve pressure from said space; means yieldingly tending to maintain the diaphragm in normal position; a valve in said pipe for controlling the flow of fluid therein; a second passage adapted to convey a fluid under pressure from a source of supply to the place of use; valve mechanism controlling said second passage and yieldingly tending to move to the open position; lock mechanism for releasably holding the valve mechanism in the closed position; valve and lock control connections whereby the diaphragm when depressed to a predetermined limit sets and locks the valve mechanism in the closed position, lost motion being provided in said connections so that the lock will not be released until the diaphragm has returned substantially to normal position; a passage between the main fluid supply and the space above the diaphragm controllable by the said valve mechanism and adapted to be opened by said mechanism to admit the full fluid pressure above the diaphragm after the latter has been depressed to a predetermined extent, whereby the latter is suddenly moved to its lowest position and the valve mechanism thereby moved to a position to fully close the aforesaid second passage.

9. In fluid control apparatus, the combination of a diaphragm casing; a diaphragm across the same; a pipe for conveying fluid under pressure leading to the space at one side of the diaphragm, a restricted waste passage being provided to relieve pressure from said space; means yieldingly tending to maintain the diaphragm in normal position; a valve in said pipe for controlling the flow of fluid therein; a second passage adapted to convey a fluid under pressure from a source of supply to the place of use; valve mechanism controlling said second passage and yieldingly tending to move to the open position; means whereby the movement of the diaphragm under fluid pressure will admit fluid pressure from the second passage at the inlet side of the valve mechanism to the aforesaid space in the diaphragm casing to move the diaphragm to its limit of movement and cause the valve mechanism to close the said second fluid passage; means for releasably holding said valve mechanism in the closed position; and means whereby the diaphragm on return substantially to normal position will release the valve mechanism to enable it to open said second passage.

10. In fluid control apparatus, the combination of a diaphragm casing; diaphragm across the same; a pipe for conveying fluid under pressure leading to the space at one side of the diaphragm, a restricted waste passage being provided to relieve pressure from said space; means yieldingly tending to maintain the diaphragm in normal position; a valve in said pipe for controlling the flow of fluid therein; a second passage adapted to convey a fluid under pressure from a source of supply to the place of use; a third passage from the source of supply leading to the aforesaid space in the diaphragm casing; a body of mercury adapted to control the second passage; a float movable by the diaphragm to displace the mercury to close the second passage; a mercury seal in the third passage adapted to be broken by the depression of the float; connections between the diaphragm and the float whereby the former may depress the float but is free to rise independently, the various parts being proportioned and arranged so that the movement of the float will break the mercury seal in the third passage before the second passage is closed; means for releasably locking down the float; and means whereby the diaphragm on returning substantially to its normal position will release the float.

11. In fluid control apparatus, the combination of a diaphragm casing; a diaphragm across the same; a pipe forming a passage for conveying a combustible gas to the space at one side of the diaphragm; means for relieving gas pressure from said space; means for igniting gas thus exhausted; a valve in said pipe for controlling the flow of fluid therein; a second passage independent of the first and adapted to convey a fluid under pressure from a source of supply to the place of use; valve mechanism controlling said second passage; and means whereby the diaphragm actuates said valve control mechanism.

12. In fluid control apparatus, the combination of a diaphragm casing; a diaphragm dividing the same; a pipe forming a passage for conveying a combustible gas to the space at one side of the diaphragm; means for relieving gas pressure from said space; means for igniting gas thus exhausted; a valve in said pipe for controlling the flow of fluid therein; a second passage independent of the first and adapted to convey a fluid under pressure from a source of supply to the place of use; valve mechanism controlling said second passage; means whereby the diaphragm actuates said valve control mechanism; and means for leading any gas which may leak through the diaphragm to a place of ignition.

13. In fluid control apparatus, the combination of a diaphragm casing; a diaphragm dividing the same; a pipe for conveying fluid under pressure leading to the space at one side of the diaphragm; means yieldingly tending to maintain the diaphragm in normal position; a valve in said pipe for controlling the flow of fluid therein; a second passage adapted to convey a fluid under pressure from a source of supply to the place of use; a third passage from the source of supply leading to the aforesaid space in the diaphragm casing; means movable by the diaphragm to close the second passage; and means whereby the movement of the diaphragm first opens the third passage and thus admits full fluid pressure to rapidly move the diaphragm to close the second passage.

14. In fluid control apparatus, the combination of a diaphragm casing; a diaphragm across the same; a pipe for conveying fluid under pressure leading to the space at one side of the diaphragm; means yieldingly tending to maintain the diaphragm in normal position; a valve in said pipe for controlling the flow of fluid therein; a second passage adapted to convey a fluid under pressure from a source of supply to the place of use; a third passage from the source of supply leading to the aforesaid space in the diaphragm casing; a body of mercury adapted to control the second passage; a float movable by the diaphragm to displace the mercury to close the second passage; valve mechanism controlling the third passage adapted to be opened by the depression of the float connections between the diaphragm and the float whereby the latter may depress the float but is free to rise independently, the various parts being proportioned and arranged so that the movement of the float will open the valve mechanism before the second passage is closed; means for releasably locking down the float; and means whereby the diaphragm on returning substantially to its normal position will release the float.

15. In fluid control apparatus, the combination of a diaphragm casing; a diaphragm across the same; a pipe for conveying fluid under pressure leading to the space at one side of the diaphragm; means yieldingly tending to maintain the diaphragm in normal position; a valve in said pipe for controlling the flow of fluid therein; a second passage adapted to convey a fluid under pressure from a source of supply to the place of use; valve mechanism controlling said second passage and yieldingly tending to move to the open position; lock mechanism for releasably holding the valve mechanism in the closed position; valve and lock control connections whereby the diaphragm when depressed to a predetermined limit sets and locks the valve mechanism in the closed position, lost motion being provided in said connections so that the lock will not be released until the diaphragm has returned substantially to normal position; a passage between the main fluid supply and the space above the diaphragm controllable by the said valve mechanism and adapted to be opened by said mechanism to admit the full fluid pressure above the diaphragm after the latter has been depressed to a predetermined extent, whereby the latter is suddenly moved to its lowest position and the valve mechanism thereby moved to a position to fully close the aforesaid second passage; means whereby the full fluid pressure above the diaphragm is cut off immediately after the closing of the second passage; and means for permitting restricted leakage from the space above the diaphragm.

16. In fluid control apparatus, the combination of a diaphragm casing; a diaphragm across the same; a pipe for conveying fluid under pressure leading to the space at one side of the diaphragm; means yieldingly tending to maintain the diaphragm in normal position; a valve in said pipe for controlling the flow of fluid therein; a second passage adapted to convey a fluid under pressure from a source of supply to the place of use; valve mechanism controlling said second passage and yieldingly tending to move to the open position; means whereby the movement of the diaphragm under fluid pressure will admit fluid pressure from the second passage at the inlet side of the valve mechanism to the aforesaid space in the diaphragm casing to move the diaphragm to its limit of movement and cause the valve mechanism to close the said second fluid passage; means for releasably holding said valve mechanism in the closed position; means whereby the full fluid pressure above the diaphragm is cut off immediately after the closing of the second passage; means for permitting restricted leakage from the space above the diaphragm; and means whereby the diaphragm on return substantially to normal position will release the valve mechanism to enable it to open said second passage.

17. In fluid control apparatus, the combination of a diaphragm casing; a diaphragm across the same; a pipe for conveying fluid under pressure leading to the space at one side of the diaphragm; means yieldingly tending to maintain the diaphragm in normal position; a valve in said pipe for controlling the flow of fluid therein; a second passage adapted to convey a fluid under pressure from a source of supply to the place of use; a third passage from the source of supply leading to the aforesaid space in the diaphragm casing; a body of mercury adapted to control the second passage; a float movable by the diaphragm to displace the mercury to close the second passage; a mercury seal in the third passage adapted to be broken by the depression of the float; connections between the diaphragm and the float whereby the latter may depress the float but is free to rise independently, the various parts being proportioned and arranged so that the movement of the float will break the mercury seal in the third passage before the second passage is closed; means for releasably locking down the float; means whereby the full fluid pressure above the diaphragm is cut off immediately after the closing of the second passage; means for permitting restricted leakage from the space above the diaphragm; and means whereby the diaphragm on returning substantially to its normal position will release the float.

18. In fluid control apparatus, the combination of a diaphragm casing; a diaphragm across the same, a pipe for conveying fluid under pressure leading to the space at one side of the diaphragm, a restricted waste passage being provided to relieve pressure from said space; means yieldingly tending to maintain the diaphragm in normal poition; a chamber containing mercury; a second passage adapted to convey a fluid under pressure from a source of supply to the place of use; a mercury sealable trap located in said passage, a communication being formed between the mercury chamber and the trap through which mercury may rise to seal the trap; a third passage from the source of supply leading to the aforesaid space in the diaphragm casing; a mercury sealable trap located in said passage at a higher level than the first mentioned trap, a communication being formed between the mercury chamber and the trap through which mercury may rise to seal the trap; a float movable by the diaphragm to displace the mercury in the mercury chamber; a mercury seal in the third passage adapted to be broken by the float before either of the traps aforesaid is sealed; connections between the diaphragm and float whereby the latter may depress the float, but is free to rise independently; means for releasably locking down the float; and means whereby the diaphragm on returning substantially to its normal position will release the float.

19. In fluid control apparatus, the combination of a diaphragm casing; a diaphragm across the same; a pipe for conveying fluid under pressure leading to the space at one side of the diaphragm, a restricted waste passage being provided to relieve pressure from said space; means yieldingly tending to maintain the diaphragm in normal position; a chamber containing mercury; a second passage adapted to convey a fluid under pressure from a source of supply to the place of use; a mercury sealable trap located in said passage, a communication being formed between the mercury chamber and the trap through which mercury may rise to seal the trap; a third passage from the source of supply leading to the aforesaid space in the diaphragm casing; a mercury sealable trap located in said passage at a higher level than the first mentioned trap, a communication being formed between the mercury chamber and the trap through which mercury may rise to seal the trap; a float movable by the diaphragm to displace the mercury in the mercury chamber; a mercury seal in the third passage adapted to be broken by the float before either of the traps aforesaid is sealed; a tube open at each end extending through the bottom of the mercury chamber, the float being slidable on said tube, said tube forming part of the passage leading to the aforesaid space at one side of the diaphragm; a plunger secured to the diaphragm and of less diameter than and extending through the tube and float; a cross bar on the upper end of said plunger adapted to engage the upper end of the float; means for releasably locking down the float; and connections between said cross bar and the locking means having lost motion provided therein whereby the diaphragm only on returning substantially to normal position will release the float.

20. In fluid control apparatus, the combination of a diaphragm casing; a diaphragm across the same; a pipe for conveying fluid under pressure leading to the space at one side of the diaphragm, a restricted waste passage being provided to relieve pressure from said space; means yieldingly tending to maintain the diaphragm in normal position; a chamber containing mercury; a second passage adapted to convey a fluid under pressure from a source of supply to the place of use; a mercury sealable trap located in said passage, a communication being formed between the mercury chamber and the trap through which mercury may rise to seal the trap; a third passage from the source of supply leading to the aforesaid space in the diaphragm casing; a mercury sealable trap located in said passage at a higher level than the first mentioned trap, a communication being formed between the mercury chamber and the trap through which mercury may rise to seal the trap; a float movable by the diaphragm to displace the mercury in the mercury chamber; a mercury seal in the third passage adapted to be broken by the float before either of the traps aforesaid is sealed comprising a stationary annular plate with a depending annular flange, and an annular mercury cup carried by the float into which said flange may dip; connections between the diaphragm and float whereby the former may depress the float, but is free to rise independently; means for releasably locking down the float; and means whereby the diaphragm on returning substantially to its normal position will release the float.

21. In fluid control apparatus, the combination of a diaphragm casing; a diaphragm dividing the same; a pipe for conveying fluid under pressure leading to the space at one side of the diaphragm, a restricted waste passage being provided to relieve pressure from said space; means yieldingly tending to maintain the diaphragm in normal position; a chamber containing mercury; a second passage adapted to convey a fluid under pressure from a source of supply to the place of use; a mercury sealable trap located in said passage, a communication being formed between the mercury chamber and the trap through which mercury may rise to seal the trap; a third passage from the source of supply leading to the aforesaid space in the diaphragm casing; a mercury sealable trap located in said passage at a higher level than the first mentioned trap, a communication being formed between the mercury chamber and the trap through which mercury may rise to seal the trap; a float movable by the diaphragm to displace the mercury in the mercury chamber; a mercury seal in the third passage adapted to be broken by the float before either of the traps aforesaid is sealed comprising a stationary annular plate with a depending annular flange, and an annular mercury cup carried by the float into which said flange may dip; a tube open at each end extending up through the bottom of the mercury chamber, the float being slidable on said tube, said tube forming part of the passage leading to the aforesaid space at one side of the diaphragm; an upward extension of the float surrounded by mercury cup, an opening being formed through said extension just above the mercury cup and extending to the bore through which the tube passes.

22. In fluid control apparatus, the combination of a diaphragm casing; a diaphragm dividing the same; a pipe for conveying fluid under pressure leading to the space at one side of the diaphragm, a restricted waste passage being provided to relieve pressure from said space; means yieldingly tending to maintain the diaphragm in normal position; a chamber containing mercury; a second passage adapted to convey a fluid under pressure from a source of supply to the place of use; a mercury sealable trap located in said passage, a communication being formed between the mercury chamber and the trap through which mercury may rise to seal the trap; a third passage from the source of supply leading to the aforesaid space in the diaphragm casing; a mercury sealable trap located in said passage at a higher level than the first mentioned trap, a communication being formed between the mercury chamber and the trap through which mercury may rise to seal the trap; a float movable by the diaphragm to displace the mercury in the mercury chamber comprising an upper part and a lower part connected by a constricted neck; a mercury seal in the third passage adapted to be broken by the float before either of the traps aforesaid is sealed; connections between the diaphragm and float whereby the former may depress the float but is free to rise independently; means for releasably locking down the float; and means whereby the diaphragm on returning substantially to its normal position will release the float.

23. In fluid control apparatus, the combination of a diaphragm casing; a diaphragm across the same; a pipe for conveying fluid under pressure leading to the space at one side of the diaphragm; means yieldingly tending to maintain the diaphragm in normal position; a valve in said pipe for controlling the flow of fluid therein; a second passage adapted to convey a fluid under pressure from a source of supply to the place of use; a third passage from the source of supply leading to the aforesaid space in the diaphragm casing; a body of mercury adapted to control the second passage; a float movable by the diaphragm to displace the mercury to close the second passage comprising an upper part and a lower part connected by a constricted neck; a mercury seal in the third passage adapted to be broken by the depression of the float; connections between the diaphragm and the float whereby the former may depress the float but is free to rise independently, the various parts being proportioned and arranged so that the movement of the float will break the mercury seal in the third passage before the second passage is closed; means for releasably locking down the float; and means whereby the diaphragm on returning substantially to its normal position will release the float.

24. In a fluid control apparatus, the combination of a diaphragm casing; a diaphragm across the same; a pipe for conveying fluid under pressure leading to the space at one side of the diaphragm; means yieldingly tending to maintain the diaphragm in normal position; a valve in said pipe for controlling the flow of fluid therein; a second passage adapted to convey a fluid under pressure from a source of supply to the place of use; valve mechanism controlling said passage movable to either an open or closed position; lock mechanism adapted to releasably hold the valve mechanism in one of said positions; yielding means tending to move the valve mechanism to its other position; valve and lock control connections whereby the diaphragm when moved to a predetermined limit sets and locks the valve mechanism, lost motion being provided in said connections so that the lock will not be released until the diaphragm has returned substantially to normal position a passage between the main fluid supply and the said space at one side of the diaphragm controllable by the said valve mechanism and adapted to be opened by said mechanism to admit the full fluid pressure to the said space after the diaphragm has been moved to a predetermined extent, whereby the latter is suddenly moved to its limit to set and lock the valve mechanism as aforesaid.

25. In fluid control apparatus, the combination of a diaphragm casing; a diaphragm across the same; a pipe for conveying fluid under pressure leading to the space at one side of the diaphragm; means yieldingly tending to maintain the diaphragm in normal position; a valve in said pipe for controlling the flow of fluid therein; a second passage adapted to convey a fluid under pressure from a source of supply to the place of use; valve mechanism controlling said second passage movable to either an open or closed position; means whereby the movement of the diaphragm under fluid pressure will admit fluid pressure from the second passage at the inlet side of the valve mechanism to the aforesaid space in the diaphragm casing to move the diaphragm to its limit of movement and cause the valve mechanism to move to one of the positions aforesaid; yielding means tending to move the valve mechanism to its other position; means for releasably holding the valve in said position, and means whereby the diaphragm on return to substantially normal position will release the valve mechanism to enable it to move to its other position.

26. In fluid control apparatus, the combination of a diaphragm casing; a diaphragm across the same; a pipe for conveying fluid under pressure leading to the space at one side of the diaphragm; means yieldingly tending to maintain the diaphragm in normal position; a valve in said pipe for controlling the flow of fluid therein; a second passage adapted to convey a fluid under pressure from a source of supply to the place of use; a third passage from the source of supply leading to the aforesaid space in the diaphragm casing; a body of mercury adapted to control the second passage; a float movable by the diaphragm to displace the mercury to close the second passage; a mercury seal in the third passage adapted to be broken by the depression of an annular flange, and an annular mercury cup carried by the float into which said flange may dip; connections between the diaphragm and the float whereby the former may depress the float but is free to rise independently, the various parts being proportioned and arranged so that the movement of the float will break the mercury seal in the third passage before the second passage is closed; means for releasably locking down the float; and means whereby the diaphragm on returning substantially to its normal position will release the float.

27. In fluid control apparatus, the combination of a diaphragm casing; a diaphragm across the same; a pipe for conveying fluid under pressure leading to the space at one side of the diaphragm; means yieldingly tending to maintain the diaphragm in normal position; a valve in said pipe for controlling the flow of fluid therein; a second passage adapted to convey a fluid under pressure from a source of supply to the place of use; a third passage from the source of supply leading to the aforesaid space in the diaphragm casing; a chamber containing a body of mercury adapted to control the second passage; a float movable by the diaphragm to displace the mercury to close the second passage; a mercury seal in the third passage adapted to be broken by the depression of the float; a tube open at each end extending up through the bottom of the mercury chamber, the float being slidable on said tube, said tube forming part of the passage leading to the aforesaid space at one side of the diaphragm; a plunger secured to the diaphragm and of less diameter than and extending through the tube and float; a cross bar on the upper end of said plunger adapted to engage the upper end of the float; means for releasably locking down the float; and connections between said cross bar and the locking means having lost motion provided therein whereby the diaphragm only on returning substantially to normal position will release the float.

28. In fluid control apparatus, the combination of a diaphragm casing; a diaphragm across the same; a pipe for conveying fluid under pressure leading to the space at one side of the diaphragm; means yieldingly tending to maintain the diaphragm in normal position; a valve in said pipe for controlling the flow of fluid therein; a second passage adapted to convey a fluid under pressure from a source of supply to the place of use; a third passage from the source of supply leading to the aforesaid space in the diaphragm casing; a body of mercury adapted to control the second passage; a float movable by the diaphragm to displace the mercury to close the second passage; a mercury seal in the third passage adapted to be broken by the depression of the float; connections between the diaphragm and the float whereby the former may depress the float but is free to rise independently, the various parts being proportioned and arranged so that the movement of the float will break the mercury seal in the third passage before the second passage is closed; means for releasably locking down the float; the parts being proportioned so that the mercury cup is submerged in the body of mercury when the float is locked down; and means whereby the diaphragm on returning substantially to its normal position will release the float.

Signed at Toronto this 15th day of Aug., 1918.

PHILIP T. JACKSON.

Copies of this patent may be obtained for five cents each, by addressing the "Commissioner of Patents, Washington, D. C."